United States Patent [19]

Kasai

[11] Patent Number: 4,692,037
[45] Date of Patent: Sep. 8, 1987

[54] ROLLER BEARING FOR AN INFINITE RECTILINEAR MOTION
[75] Inventor: Naomi Kasai, Tokyo, Japan
[73] Assignee: Nippon Thompson Co., Ltd., Tokyo, Japan
[21] Appl. No.: 947,609
[22] Filed: Dec. 30, 1986
[30] Foreign Application Priority Data Mar. 4, 1986 [JP] Japan .................................. 61-46666

[51] Int. Cl.$^4$ ............................................. F16C 29/06
[52] U.S. Cl. ........................................ 384/44; 384/45
[58] Field of Search .................................. 384/43–45; 464/168

[56]  References Cited
U.S. PATENT DOCUMENTS

| 4,496,198 | 1/1985 | Geka | 384/44 |
| 4,504,097 | 3/1985 | Mottate | 384/44 |
| 4,511,189 | 4/1985 | Mottate | 384/44 |
| 4,556,262 | 12/1985 | Geka | 384/44 |

Primary Examiner—Stuart S. Levy
Assistant Examiner—Thomas R. Hannon
Attorney, Agent, or Firm—Trexler, Bushnell, Giangiorgi & Blackstone, Ltd.

[57]  ABSTRACT

A roller bearing is composed of a truck rail, a casing mounted astride the truck rail and a number of rollers arranged in a parallel-roller type; a return passage formed in the casing is connected to a truck face of the truck rail through a direction change passage for an infinite rectilinear motion, further in a part of the direction change passage there is formed a twisting passage, which makes it possible to form the truck groove and the return passage approximately on the same horizontal plane. Further in a bearing having four rows of endless circulation passages, the twisting passage can be formed either only in a pair of corresponding roller-rows or in the all of the roller-rows. Thus there can be provided a roller-bearing having the lowest possible sectional height, and comparatively a great load capacity, at a reasonable price.

2 Claims, 10 Drawing Figures

ROLLER BEARING FOR AN INFINITE RECTILINEAR MOTION

BACKGROUND OF THE INVENTION

1. Field for Industrial Utilization

The present invention relates to a roller bearing wherein two members are placed in a relatively infinite rectilinear motion by endlessly circulating in a direction of rectilinear motion, cylindrical rollers or long cylindrical rollers inserted between two members. More specifically, this invention relates to a roller bearing for an infinite rectilinear motion of what is called a parallel-roller type, wherein cylindrical rollers are so arranged that each axis of the rollers are parallel with each other, and directed in the same direction on the truck face of a row in which the cylindrical rollers roll over.

2. Prior Arts

As types of roller-arrangement of this kind of roller bearings for an infinite rectilinear motion on a truck face, there can be classified into a cross-roller type where rollers are so arranged that axes of adjacent rollers may cross perpendicularly with each other, and a parallel-roller type where axes of adjacent rollers are arranged in the same direction.

In the case of a cross-roller type bearing, two rows for endless circulation (endless circulation passage) of rollers are sufficient for the bearing to carry load in every direction, hence it is possible to manufacture a roller bearing of a low sectional height.

But in the case of a parallel-roller type bearing, at least four rows of endless circulation passages for rollers are required for the bearing to carry load in every direction. And as compared with a cross-roller type bearing, the sectional height of the bearing will become greater by the increased number of the row, and its construction will become more complicated.

With reference to FIG. 9, detailed description will be given of a parallel-roller type bearing. FIG. 9 is symmetrical with the center line, so symbols are given only to members on the left side. When a slide unit 11 is mounted astride a truck rail 12, rollers 13 and 13A are inclined, for example, at an angle of 45 degrees, relative to the center line, and are arranged such that each extension line (not illustraed) of the axes (rotation axes) of the rollers 13 and 13A may cross perpendicularly, so that the bearing may carry load in every direction. In a casing 11, return passages 14 and 14A are provided, and the return passages 14 and 14A are connected respectively, through direction change passages 15 and 15A, with two truck grooves in which the rollers 13 and 13A are present.

In order to enable the rollers to smoothly roll over in the truck grooves, direction change passages 15 and 15A, and the return passages 14 and 14A, the return passages 14 and 14A need to be formed respectively at the positions inclined at 45 degrees from the two truck grooves relative to the horizontal plane. A height h1 of the casing 11 to satisfy such conditions tends to become considerably great as compared with that of a cross-roller type bearing. That is, in the conventional parallel-roller type bearing, due to motional characteristics of rollers, a width and a sectional height will inevitably become great (for example, refer to Japanese Patent Application No. 248789-1983 etc.), further the number of parts tend to by many, and the bearing becomes expensive.

To reduce the casing height, a proposal was made that the truck grooves, direction change passages 15 and 15A, and return passages 14 and 14A are cross arranged in such a relation as shown in FIG. 10, (for example, refer to Japanese Patent Application No. 94552-1981). In this case, the height h2 of the casing 11 is fairly smaller than in the case of FIG. 9 (height h1). However, it requires very complicated and difficult machining processes to work and form the inside of the casing 11 such that the direction change passage 15 and 15A may cross without interfering each other, and therefore, further accurate manufacture of the bearing is difficult, and that leads to increase of manufacturing cost.

SUMMARY OF THE INVENTION

Objects of the Invention

The purpose of the present invention is to remove such disadvantages of the conventional parallel-roller-type roller-bearing for a rectilinear motion, and provide a roller bearing for an infinite rectilinear motion which is of a small type, and has a large load capacity, and further manufacturing cost thereof is reasonable.

Constructions to Solve The Problem

To attain the aforesaid objects, the present invention has the following constructions.

In a roller bearing for an infinite rectilinear motion comprising:

a long truck rail in which a truck face is formed on the outside face thereof;

a casing which is mounted astride the truck rail, and in which a truck face is formed at a location opposite to the truck face of the truck rail; and a number of rollers to be inserted between the truck face of the truck rail and the truck face of the casing;

the rollers being arranged on the basis of a parallel-roller type;

a return passage for the rollers being formed in the casing;

a side plate where a direction change passage is formed being attached to the both longitudinal end portions of the casing, and the direction change passage connecting the truck face and the return passage, the roller bearing for an infinite rectilinear motion is characterized in that a twisting passage is formed in a portion of the direction change passage, and an angle made by the axis of the roller relative to a sliding direction (the horizontal plane), viewed from the sliding direction of the bearing, will change in the twisting passage.

And in the present invention, four rows of endless circulation passages for rollers are formed, and the twisting passages are formed in direction change passages at least in a pair of roller rows corresponding to each other.

Action of the Present Invention

In a bearing according to the present invention, the truck groove and the return passage can be formed approximately on the identical horizontal plane by forming the twisting passage. Accordingly, in this kind of roller bearing of a four row, parallel-roller type, the present invention provides a roller bearing having the lowest possible sectional height.

BRIEF DESCRIPTION OF DRAWINGS

FIG. 1 is a perspective view of the first embodiment,

FIG. 2 is a fragmentary front sectional view of the bearing in FIG. 1,

FIG. 3 is a side view seen from the direction C in FIG. 2,

FIG. 4 is a sectional view seen from the direction A in FIG. 2,

FIG. 5 is a sectional view illustrating a modification of the first embodiment,

FIG. 6 is a perspective view of cylindrical rollers seen from the direction B in FIG. 2, FIG. 7 is a sectional view of the second embodiment of the present invention, FIG. 8 is a sectional view illustrating the third embodiment of the present invention.

DETAILED DESCRIPTION OF THE EMBODIMENTS

Referring to drawings, a preferable embodiment of the present invention is explained in detail below.

Figure 1:
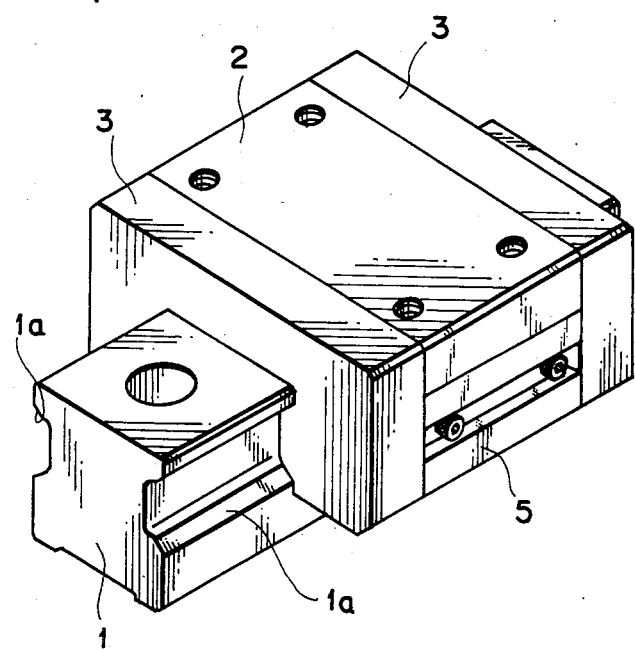
FIGS. 1–8 illustrate embodiments of the present invention.
Figure 2:
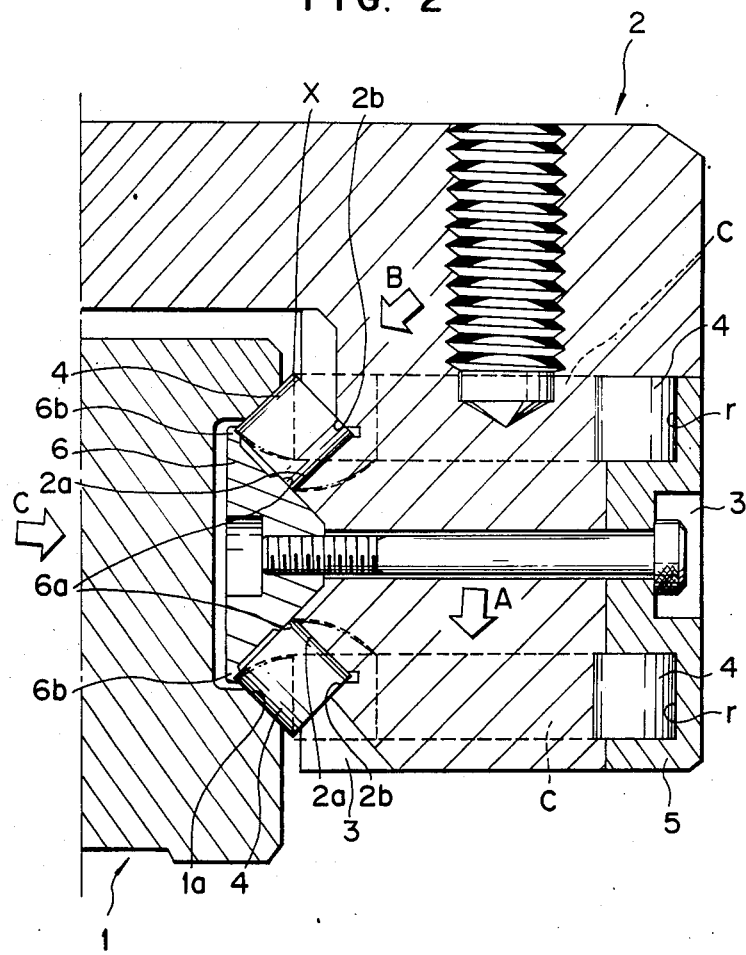

FIGS. 1-5 illustrate a first embodiment of the present invention. FIG. 1 is a general perspective view illustrating the first embodiment, and FIG. 2 illustrates a construction of the upper and the lower two rows among four rows of cylindrical rollers 4 at the right of the center line (the alternate long and short dash line).

Truck faces 1a are formed on the slant faces of the both edges of the recessed portions formed on the both side faces of the long truck rail 1 having an approximately I-shaped section. Truck faces 2a are formed in the location on the inside surrounding face opposite to each truck face 1a, in a casing 2 having an approximately reversed-U-shaped section, mounted astride the truck rail 1. A number of cylindrical rollers 4 are arranged between the truck face 1a of the truck rail 1 and the truck face 2a of the casing 2, and the cylindrical rollers 4 endlessly circulate in the endless circulation passage comprising a truck groove, direction change passages c and a return passage r. To circulate endlessly the cylindrical rollers 4, a side plate 3 and a return passage cover 5 are attached to predetermined locations of the casing 2.

In the bearing of the present invention, the roller arrangement is of a parallel-roller type, hence, for example, in the case of the upper row in FIG. 2, the axis of the roller 4 between the truck faces inclines at 45 degrees, viewed from the sliding direction, relative to the plane in the sliding direction of the bearing (the horizontal plane). The cylindrical rollers 4 on the truck face are restrained from skewing by the guide surface 6a of the support plate 6 and the guide surface 2b of the casing 2. At the same time, the cylindrical rollers 4 are so held by the supporting portion 6b of the supporting plate 6 that they will not fall out, even if the casing 2 is removed from the truck rail 1.

The return passage r for returning the cylindrical rollers 4 is formed by the space between the outside face of the casing 2 and the return passage cover 5.

Figure 3:
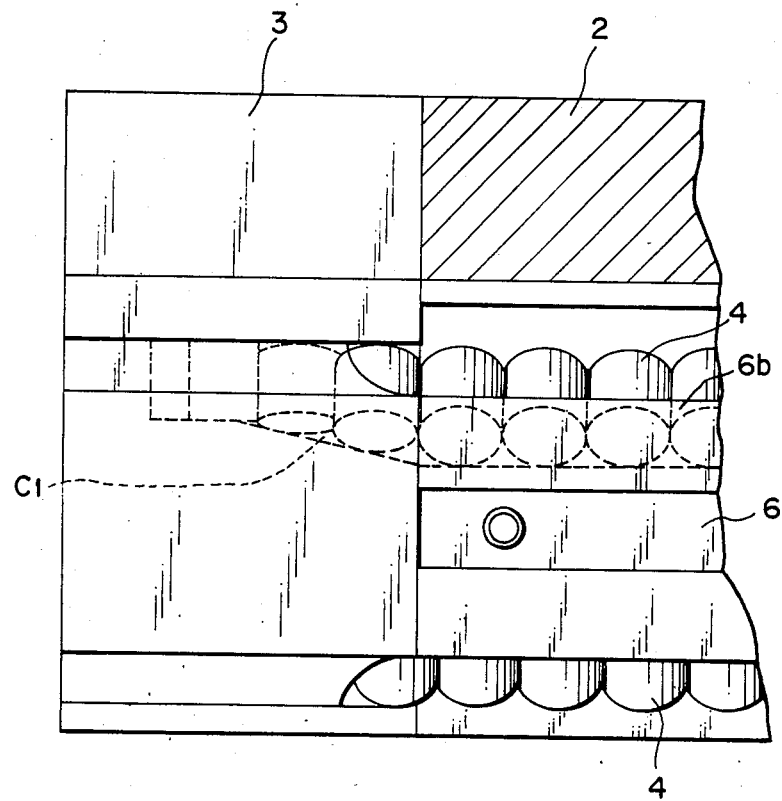

FIG. 3 is a side view, viewed from the direction C in FIG. 2. Side plates 3 are fixed respectively on the both ends in the sliding direction of the casing 2, the direction change passage (c) is formed in the side plate 3 to connect the return passage (r) with the truck face 2a (FIG. 2). Referring to the cylindrical roller 4 guided into the side plate 3, the angle between the axis thereof and the horizontal plane, viewed from the sliding direction, is allowed to change gradually to a right angle.

Figure 4:
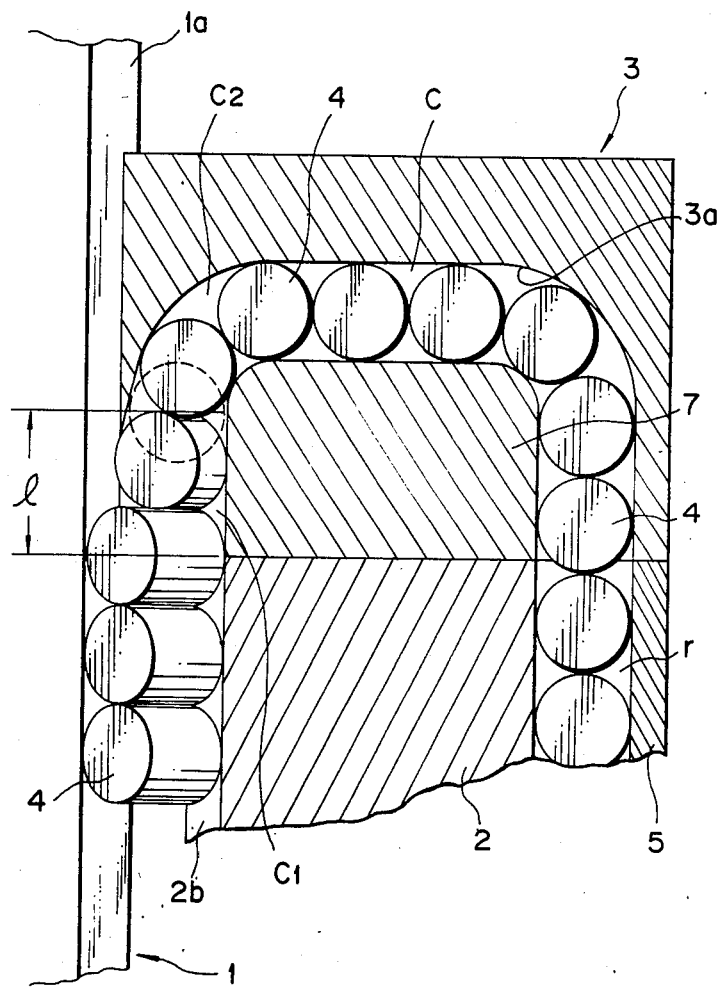
Figure 5:
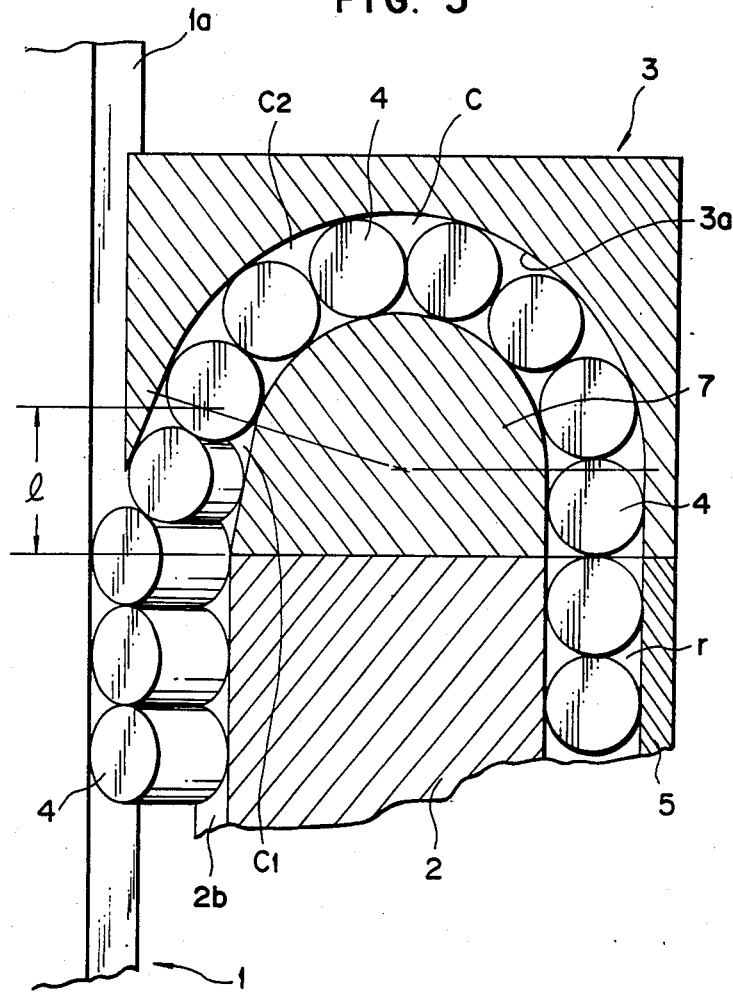

FIG. 4 is a sectional view of the roller row on the lower side in FIG. 2, viewed from above, and FIG. 5 is a partially modified example of FIG. 4. The direction change groove 3a is formed in the side plate 3 attached to the end face of the casing 2, this direction change groove 3a, together with the spacer 7 set at a predetermined location in the side plate 3, forms the direction change passage c. As stated above, the endless circulation passage is formed by the truck groove (between the truck faces 1a and 2a), the direction change passage c and the return passage r.

In either row of the upper or the lower side, the axis of the cylindrical roller 4 is inclined at 45 degrees relative to the plane in the sliding direction of the casing 2 on the truck rail 1, that is, to the horizontal plane, viewed from the sliding direction; extensions of axes of rollers on the truck faces in each of the upper and the lower rows cross with each other within the bearing so that the bearing may carry loads burdened from every direction.

The direction change passage c formed in the side plate 3 is composed of at least two passages. The first passage is a twisting passage c1, which passage c1 is formed in succession to the truck face, and is twisted in the direction of motion in a range of distance l. If l is made greater, the roller will move more smoothly, but at the same time, the length of the side plate 3 will become longer, hence practically the length of l will be approximately double the diameter of the roller.

The second passage is an arc passage c2, which is formed in succession to the first twisting passage c1 to change the direction of the cylindrical rollers 4 and lead them into the return passage r.

As a cylindrical roller 4 thus led from the truck face 2a to the side plate 3 moves directly forward through the first twisting passage c1, it goes away from the truck rail 1, and the load burdened thereupon is removed, and at the same time, the axis which is inclined at 45 degrees relative to the plane in the sliding direction, or to the horizontal plane, viewed from the sliding direction, becomes gradually perpendicular to the horizontal plane. When the cylindrical roller 4 has moved forward through the twisting passage c1 in the side plate 3 by distance l in its motional direction, the axis of the roller 4 becomes completely perpendicular to the horizontal plane. In the no-load region with the exception of the first twisting passage c1, namely in the arc passage c2 and in the return passage r, the cylindrical roller 4 moves on in that state (where the roller axis is perpendicular to the horizontal plane).

As regards the example of FIG. 4, such a method is adopted to the upper cylindrical-roller row, that while the roller is being moved on approximately directly in the direction of the movement and its extension, the roller is twisted with the highest position X (FIG. 2) of the cylindrical roller on the truck face as a reference, and when the axis of the roller has become perpendicular to the horizontal plane, and the twisting has almost been completed, the roller is moved to an arc passage. Besides the above method, applicable is also another method where while the roller 4 is being twisted as illustrated in FIG. 5, the roller whole is allowed to go gradually away from the truck rail 1; further such an intermediate method of the above methods is also applicable, for example, that the roller is twisted, without changing the reference for twisting the roller, from the truck face to a certain distance in the twisting passage $c_1$, and after that distance, while the roller is allowed to go away from the truck rail, the roller is twisted.

Figure 6:
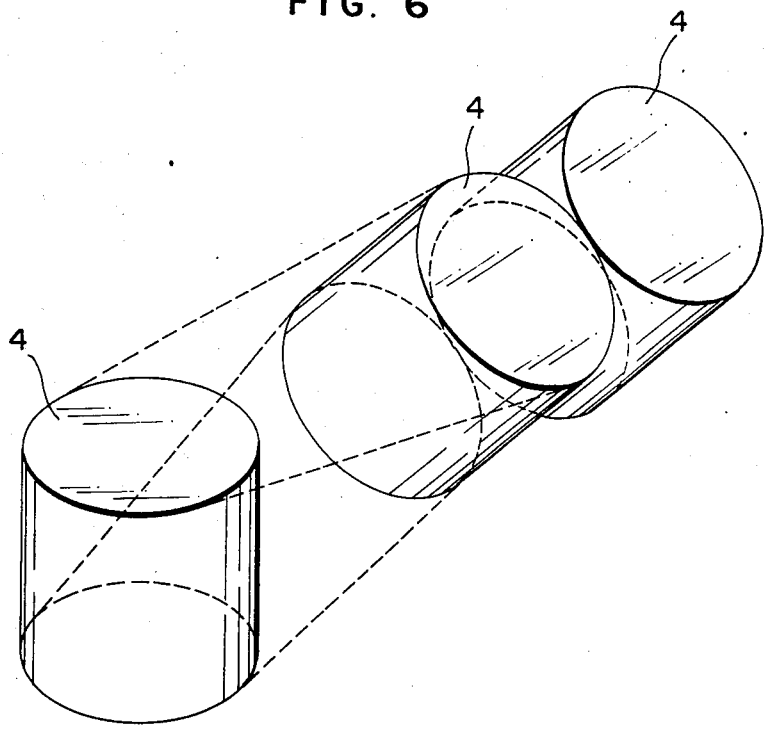

FIG. 6 illustrates cylindrical rollers near the twisting passage ($c_1$) in the upper roller row of FIG. 2, viewed from a oblique upper position, where the behavior of rollers in the in the twisting passage is schematically shown.

Incidentally, it is also possible that the casing 2 is formed separably by a portion for fixing other members and a skirt portion of the bearing, and that the width of the bearing is optionally set by modifying the position of the skirt portion relative to the fixing portion.

As stated above, in the first embodiment, notwithstanding the bearing type is of a four-row parallel-roller type, the return passage can be formed respectively approximately in a position in the horizontal direction in the load region, accordingly the construction of the whole bearing can be made very simple, and a miniaturized, highly accurate roller bearing for an infinite rectilinear motion can be provided at a reasonable price.

Figure 7:
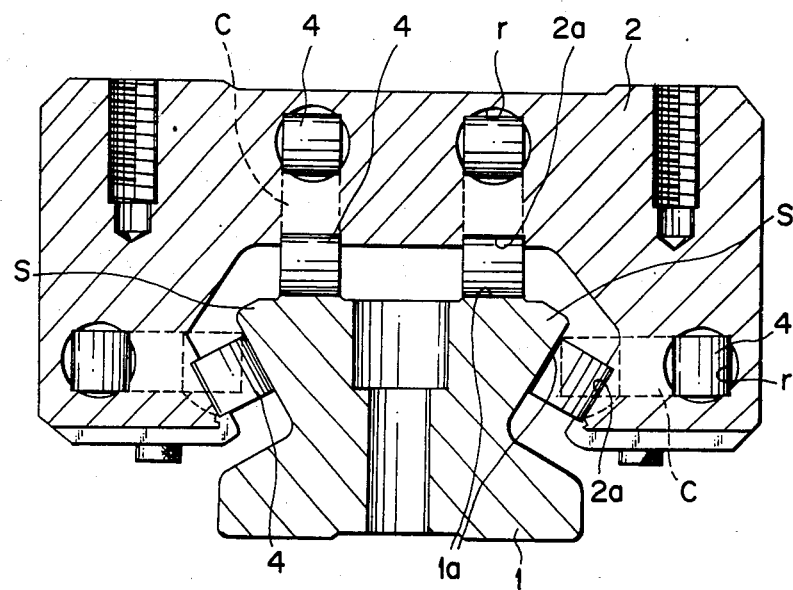

FIG. 7 illustrates a second embodiment of the present invention. In the first embodiment shown in FIG. 1–FIG. 5, the truck faces are formed on the both inside slant faces of the recessed portions (the recess in which the supporting plate 6 is accommodated) of the truck rail, but in the second embodiment illustrated in FIG. 7, the truck faces are formed in a manner such that the rollers may clamp the projecting portion s of the truck rail from both sides.

The through hole formed by a square in combination with a circle in the casing 2 is a return passage r. In this example, a conventional art is adopted to the upper roller row, and the art of the present invention is practised for the lower row, and even in the case where the art of the present invention is applied only to the lower row, the bearing can fairly be miniaturized.

In the second embodiment, the truck face of the upper row and the roller axis are respectively at an angle of 0 degrees to the horizontal plane, viewed in the sliding direction; and only in the lower roller row, "a twisting passage" is formed in a part of the direction change passage. But "the twisting passage" can also be formed in the direction change passage in the upper row, thereby to lower further the sectional height of the bearing.

Figure 8:
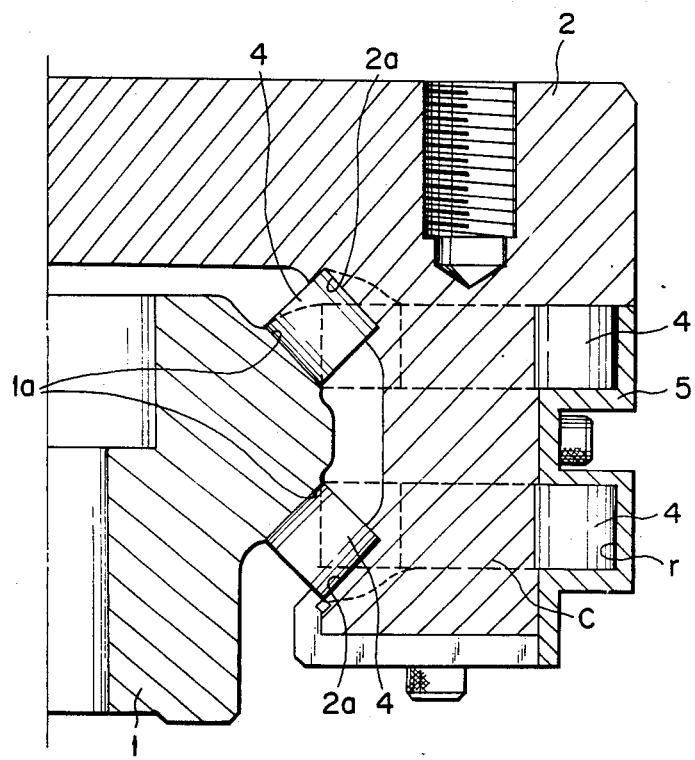
Figure 9:
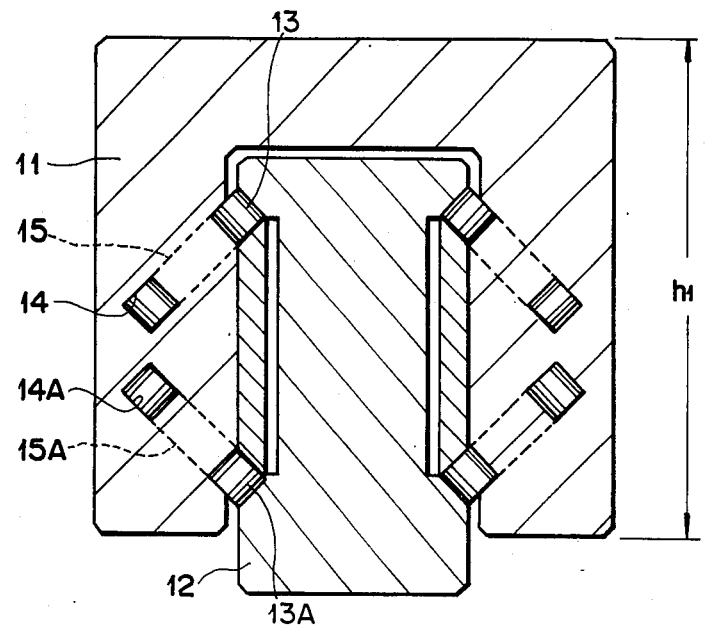
FIGS. 9 and 10 are front sectional views illustrating contentional arts.
Figure 10:
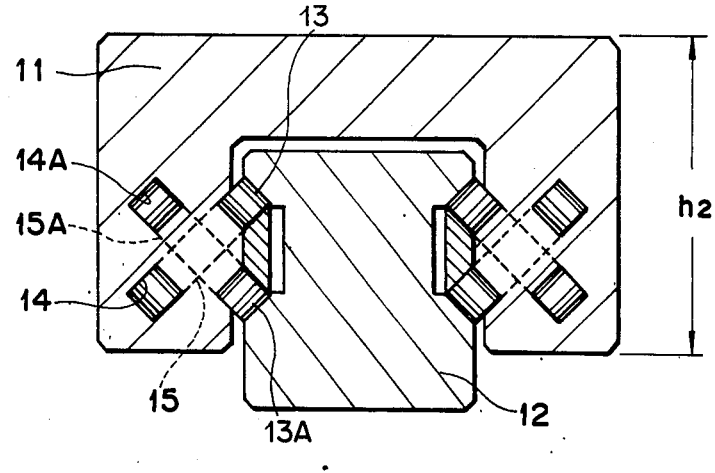

The third embodiment is shown in FIG. 8 where the roller axes in the upper and the lower rows are respectively at an angle of 45 degrees to the horizontal plane, viewed from the sliding direction, and each direction change passage having "twisting" is formed respectively in the all four rows. In the third embodiment, the bearing is further miniaturized than the second embodiment, and the load capacities respectively in the upper and the lower roller rows are identical with each other.

Further such modifications in the design can readily be practised in the present invention that diameters of the upper and the lower cylindrical rollers may be changed according to use conditions, or that the angle between the roller axis and the horizontal plane, viewed from the sliding direction, is made different from 45 degrees, and some other modifications.

Further not only such a cylindrical roller illustrated as a rolling element, but also a long cylindrical roller can also be employed, as a case may be.

EFFECT OF THE INVENTION

The present invention has the following effects.

(1) As this kind of the bearing of the four-row and parallel-roller type, the lowest possible sectional height can be attained.

(2) Since the construction of the endless circulation passage for the roller is simple, the manufacturing cost becomes reasonable.

(3) As compared with a two-row cross-roller type bearing, the present bearing has a greater load capacity.

What is claimed is:

1. In a roller bearing for an infinite rectilinear motion comprising:
   a long truck rail in which a truck face is formed on the outside face thereof;
   a casing which is mounted astride the truck rail, and in which a truck face is formed at a location opposite to the truck face of the truck rail; and
   a number of rollers to be inserted between the truck face of the truck rail and the truck face of the casing;
   the rollers being arranged on the basis of a parallel-roller type;
   a return passage for the rollers being formed in the casing,
   a side plate where a direction change passage is formed being attached to the both longitudinal end portions of the casing, and the direction change passage connecting the truck face and the return passage,
   the roller bearing for an infinite rectilinear motion is characterized in that
   a twisting passage is formed in a portion of said direction change passage, and
   an angle made by the axis of the roller relative to a plane in the sliding direction, viewed from the sliding direction of the bearing, will change in the twisting passage.

2. A roller bearing for an infinite rectilinear motion of claim 1 wherein four rows of endless circulation passages for said rollers are formed, and said twisting passages are formed in the direction change passages at least in a pair of corresponding two roller-rows.

* * * * *